(12) United States Patent
Chen et al.

(10) Patent No.: US 8,007,114 B2
(45) Date of Patent: Aug. 30, 2011

(54) SMALL-SIZED PROJECTOR WITH HIGH HEAT DISSIPATING EFFICIENCY

(75) Inventors: Chien-Fu Chen, Taipei Hsien (TW); Yi-Ping Hsieh, Taipei Hsien (TW); Tsung-Je Chiu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 444 days.

(21) Appl. No.: 12/334,538

(22) Filed: Dec. 15, 2008

(65) Prior Publication Data
US 2010/0033690 A1 Feb. 11, 2010

(30) Foreign Application Priority Data

Aug. 11, 2008 (CN) .......................... 2008 1 0303651

(51) Int. Cl.
*G03B 21/16* (2006.01)
*H01S 3/04* (2006.01)
(52) U.S. Cl. ........................................ 353/61; 372/36
(58) Field of Classification Search ............... 353/31, 353/33, 34, 52, 57–59, 61, 101, 109, 122; 349/58, 62, 67; 372/36; 359/40, 41; 348/748, 348/789
See application file for complete search history.

(56) References Cited

U.S. PATENT DOCUMENTS

| 5,951,136 A * | 9/1999 | Furuhata et al. ................. 353/31 |
| 2007/0139887 A1* | 6/2007 | Lee et al. ....................... 361/700 |

* cited by examiner

*Primary Examiner* — Georgia Epps
*Assistant Examiner* — Don Williams
(74) *Attorney, Agent, or Firm* — Zhigang Ma

(57) ABSTRACT

A projector includes a housing, a projection lens, a receiving member, an optical engine, a light source module, a heat sink, and a fan. The housing includes a bottom wall and four sidewalls, the bottom wall and the four sidewalls together define a receiving space. One of the sidewalls a number of first vents, the other three sidewalls define a number of second vents. The projection lens is located at an intersecting corner of the sidewalls. The receiving member includes a first receiving portion and a second receiving portion. The optical engine is received in the second receiving portion. The light source module is received in the first receiving portion. The heat sink is located at an intersecting corner of the sidewalls. The fan is located at an intersecting corner of the sidewalls.

19 Claims, 2 Drawing Sheets

US 8,007,114 B2

SMALL-SIZED PROJECTOR WITH HIGH HEAT DISSIPATING EFFICIENCY

TECHNICAL FIELD

The present disclosure generally relates to projectors and, particularly, to a small-sized projector having high efficiency in heat dissipation.

BACKGROUND

Projectors typically include a high-power lamp, a heat sink, and a fan. The heat sink is for dissipating excess heat generated by the high-power lamp. The fan is for establishing airflow to remove heat from the projector. The heat sink and fan use up a lot of space, adding substantially to the size of the projectors.

What is needed, therefore, is a projector that overcomes the above mentioned problems.

DETAILED DESCRIPTION OF THE EMBODIMENTS

Figure 1:
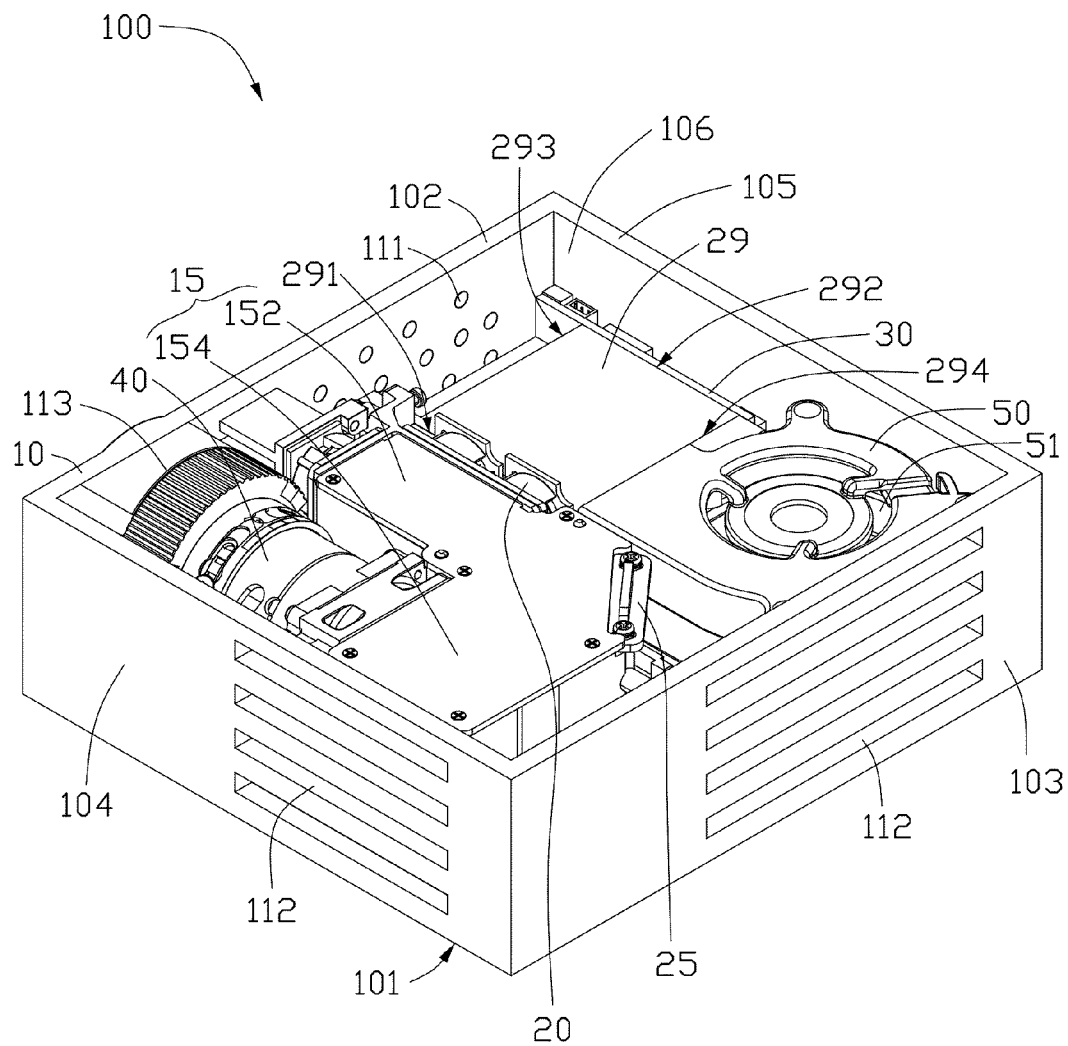
FIG. 1 is an isometric view of a projector, according to an exemplary embodiment of the disclosure.
Figure 2:
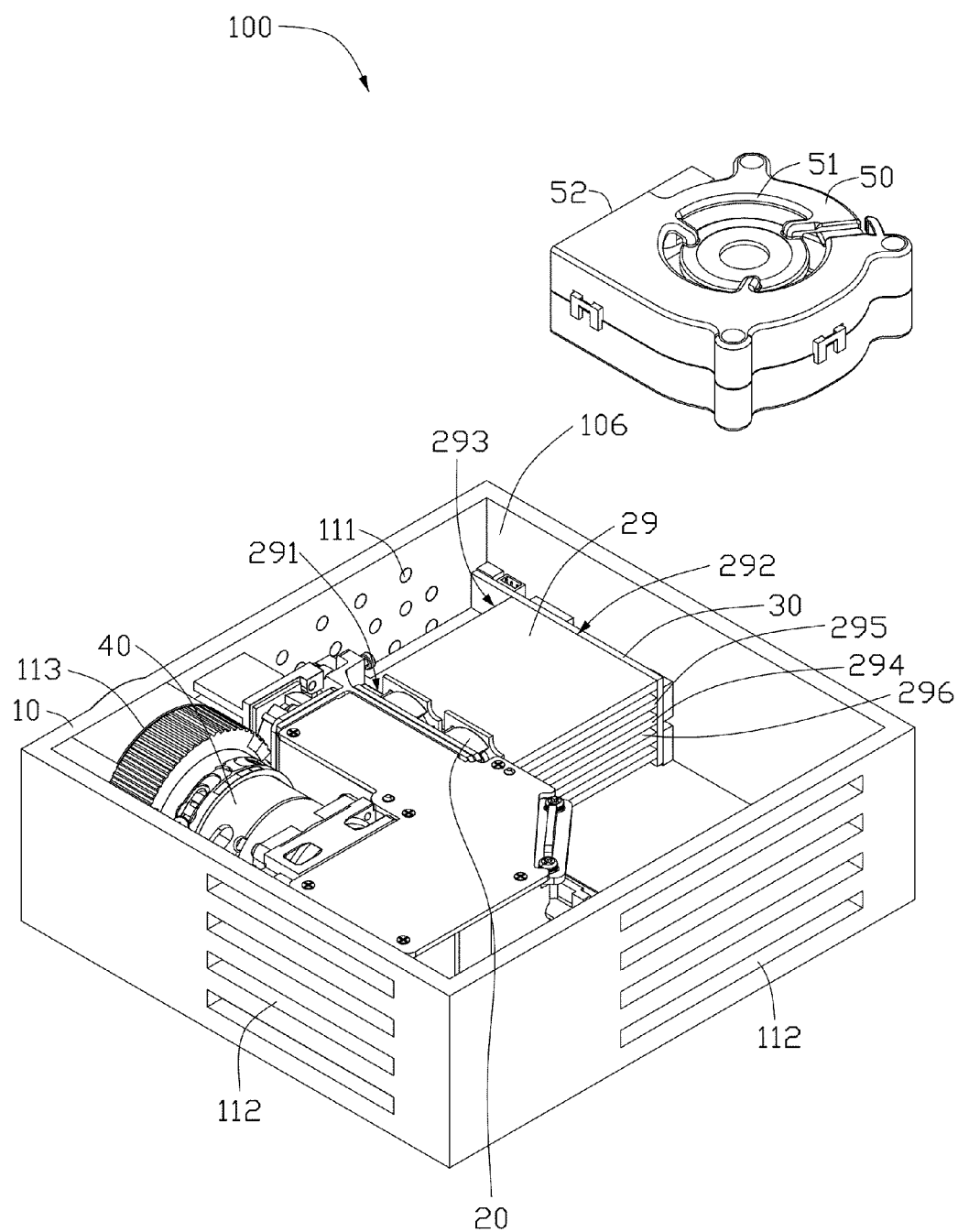
FIG. 2 is a partially exploded view of the projector of FIG. 1.

Referring to FIGS. 1 and 2, a projector 100, according to an exemplary embodiment, is shown. The projector 100 includes a housing 10, a receiving member 15, a light source module 20, an optical engine 25, a heat sink 29, a projection lens 40, and a fan 50.

The housing 10 includes a bottom wall 101 and four sidewalls: first sidewall 102, second sidewall 103, third sidewall 104 and fourth sidewall 105. The bottom wall 101 and the four side walls together define a receiving space 106. The first sidewall 102 defines a lens hole 113 adjacent to the third sidewall 104, and a number of first vents 111 near the fourth sidewall 105, the third sidewall 104 and fourth sidewall 105 also define a number of second vents 112. In this embodiment, the first vents 111 are small circular holes, and the second vents 112 are slots.

The projection lens 40 is received in the housing 10 with the magnification end thereof protruding out the housing 10 from the lens hole 113 of the first sidewall 102, and is located at an intersecting corner of the first sidewall 102 and third sidewall 104, consuming about ⅙ of the receiving space 106.

The receiving member 15 defines a first receiving portion 152 and a second receiving portion 154 communicating with and substantially perpendicular to the first receiving portion 152. The first receiving portion 152 is configured for receiving the light source module 20, and the second receiving portion 154 is configured for receiving the optical engine 25. The second receiving portion 154 is located at an intersecting corner of the third sidewall 104 and the second sidewall 103, also using up about ⅙ of the receiving space 106. The first receiving portion 152 is located in the middle of the space 106, and parallel to the projector lens 40, using up only about ⅓ of the receiving space 106. The receiving member 15 is made of good thermal conductivity material, such as aluminum, magnesium or alloy thereof.

In this embodiment, the light source module 20 is a light emitting diode (LED) module, which may consist of a number of red, green and blue LEDs. The LEDs can be arranged in an approximately L-shaped configuration. Also, the LEDs can be arranged in other compact arrangements, for example, linearly arranged. Alternatively, in other embodiments, the light source module 20 can be a metal halide lamp or a xenon lamp.

The optical engine 25 optically couples the light source 20 and the projection lens 40 and may includes a set of condensing lenses, reflector, dichromic mirror, spatial light modulator, and color light combiner (not shown), which is arranged along the path of light generated by the light source 20 and is configured for modulating the light into optical images and directing the optical images to the minification end of the projection lens 20.

The heat sink 29 is also received in the housing 10 and located at an intersecting corner of the first sidewall 102 and the fourth sidewall 105, consuming about ⅙ volume of the receiving space 106. The heat sink 29 is substantially cubic, and includes four side surfaces: a first surface 291 in contact with the first receiving portion 152 of the receiving member 15, a second surface 292 facing away from the first surface 291, a third surface 293 facing the first vents 111 of the first sidewall 102, and a fourth surface 294 facing away from the third surface 293. The heat sink 29 includes a number of fins 295, the fins 295 are all substantially parallel to the bottom wall 101 so that a number of air channels 296 substantially perpendicularly to the third and fourth walls 104, 105 are defined between the fins 295.

The fan 50 is also received in the housing 10 and located at an intersecting corner of the second sidewall 103 and the fourth sidewall 105, consuming about ⅙ volume of the receiving space 106. The fan 50 defines an air outlet 52 facing the fourth surface 294 of heat sink 29 so that airflow produced by the fan 50 can flow past the air channels 296 with extremely low air resistance, and an air inlet 51 defined on the upper surface of the fan 50. The heat sink 29 is configured for dissipating heat generated by the light source 20 consuming less than ⅙ of the space 106.

In this embodiment, the projector 100 further includes a driving circuit board 30, the driving circuit board 30 is configured for driving the light source 20 to light and is electrically connected to the light source 20. The driving circuit board 30 can be directly disposed on the light source 20. However, in this embodiment, the driving circuit board 30 is fixed to the second surface 292 of the heat sink 29. The heat sink 29 is capable of dissipating heat generated by the driving circuit board 30.

It is proved by our exemplary models that, being so constructed, the components of the projectors 100 are in an compact arrangement. The receiving space 106 is efficiently utilized. Accordingly, the size of the projector 100 is substantially decreased. In addition, the fan 50 establishing airflow from the second vent 112 to the air inlet 51, to the air outlet 52, to the air channels 296, and to the first vents 111 can efficiently bring heat dissipated by the heat sink 29 out of the housing 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A projector comprising:
    a housing comprising a bottom wall and a first sidewall, a second sidewall, a first sidewall and a second sidewall, the bottom wall, the first sidewall, the second sidewall and the first and second sidewalls together defining a receiving space, the first sidewall defining a lens hole and a plurality of first vents, the second sidewall and the two sidewalls defining at least one second vent;

a projection lens received in the housing with the magnification end thereof protruding out the housing from the lens hole, and located at an intersecting corner of the first sidewall and the first sidewall;

a receiving member comprising a first receiving portion, and a second receiving portion communicating with and substantially perpendicular the first receiving portion, the first receiving portion located in the middle of the receiving space and parallel to the projection lens, the second receiving portion located at an intersecting corner of the second sidewall and the first sidewall;

an optical engine received in the second receiving portion of the receiving member, and optically coupled to the projection lens;

a light source module received in the first receiving portion of the receiving member, and optically coupled to the optical engine;

a heat sink located at an intersecting corner of the first sidewall and the second sidewall, and comprising a first surface in contact with the first receiving portion of the receiving member, a second surface facing away the first surface, a third surface facing close to the first vents of the first sidewall, and a fourth surface facing away from the third surface; and a fan located at an intersecting corner of the fourth sidewall and the second sidewall, and adjacent to the heat sink.

2. The projector as claimed in claim 1, wherein the lens hole defined on the first sidewall is adjacent to the third sidewall, the first vents defined on the first sidewall are near the fourth sidewall; the at least one second vent are defined in the second sidewall, third sidewall and fourth sidewall, respectively.

3. The projector as claimed in claim 2, wherein the plurality of first vents are small circular holes, the plurality of second vents are slots.

4. The projector as claimed in claim 1, wherein the light source module comprises a light emitting diode (LED) module.

5. The projector as claimed in claim 4, wherein the LED module is consisted of red, green and blue LEDs.

6. The projector as claimed in claim 4, wherein the LEDs are linearly arranged or L-shaped arranged.

7. The projector as claimed in claim 6, wherein the fan defines an air outlet facing the heat sink and an air inlet on the upper surface of the fan.

8. The projector as claimed in claim 1, wherein the optical engine includes a set of condensing lenses, reflector, dichromic mirror, spatial light modulator, color light combiner arranged along the path of light generated by the light source module and is configured for modulating the light into optical images and directing the optical image to the minification end of the projection lens.

9. The projector as claimed in claim 1, wherein the heat sink includes a plurality of fins substantially parallel to each other and substantially parallel to the bottom wall.

10. The projector as claimed in claim 9, a plurality of air channels defined between the fins.

11. The projector as claimed in claim 1, wherein the receiving member is made of thermal conductivity material.

12. The projector as claimed in claim 11, wherein the thermal conductivity material is aluminum, magnesium or alloy.

13. The projector as claimed in claim 11, wherein the projector further comprises a driving circuit board configured for driving the light source to light and is electrically connected to the light source, the driving circuit is fixed the second surface of the heat sink.

14. The projector as claimed in claim 1, wherein the projection lens takes about one sixth of the receiving space.

15. The projector as claimed in claim 1, wherein the fan takes about one sixth of the receiving space.

16. The projector as claimed in claim 1, wherein the heat sink takes about one sixth of the receiving space.

17. The projector as claimed in claim 1, wherein the second receiving portion takes about one sixth of the receiving space.

18. The projector as claimed in claim 1, wherein the first receiving portion takes about one third of the receiving space.

19. The projector as claimed in claim 1, wherein the projection lens takes about one sixth of the receiving space, the fan takes about one sixth of the receiving space, the heat sink takes about one sixth of the receiving space, the second receiving portion takes about one sixth of the receiving space, and the first receiving portion takes about one third of the receiving space.

* * * * *